United States Patent
Fischer

(10) Patent No.: US 6,398,471 B1
(45) Date of Patent: Jun. 4, 2002

(54) UTILITY LUG NUT TENSION INDICATOR

(75) Inventor: John D. Fischer, Whitmore Lake, MI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/594,403

(22) Filed: Jun. 15, 2000

(51) Int. Cl.[7] ............................ F16B 31/02; F16B 37/14
(52) U.S. Cl. ............................. 411/8; 411/431; 411/433
(58) Field of Search .................. 411/8, 9, 14, 429–433, 411/372.5, 372.6, 373

(56) References Cited

U.S. PATENT DOCUMENTS

| | | | |
|---|---|---|---|
| 4,962,968 A | * | 10/1990 | Caplin |
| 5,049,017 A | * | 9/1991 | Reynolds |
| 5,082,409 A | | 1/1992 | Bias |
| 5,120,174 A | | 6/1992 | Patti |
| 5,590,992 A | * | 1/1997 | Russell |
| 5,624,218 A | * | 4/1997 | Dauwalter |

FOREIGN PATENT DOCUMENTS

DE  2950254  * 6/1981

* cited by examiner

*Primary Examiner*—Flemming Saether
(74) *Attorney, Agent, or Firm*—Mark W. Croll; John H. Pilarski; Paul F. Donovan

(57) ABSTRACT

A tension indicator for use with a fastener that is formed from a stack of conical washers confined in the stack by a cage having a longitudinally extending slot formed therein provides readily discernible visual indication of tension or loss of tension in the fastener joint. The indicator includes a body configured for receipt over the stack of conical washers. The body can include at least one stanchion extending inwardly of the body from the interior surface to define a stanchion end longitudinally spaced from the body end. At least one detent extends inwardly of the body and is longitudinally spaced from the body end. When the stack of conical washers is placed under tension with the uppermost washer in a planar condition, the stanchion lies adjacent the uppermost washer at the interior region. When the stack of conical washers is under a tension insufficient to urge the uppermost washer into the planar condition, the stanchion abuts the uppermost washer at the interior region and the detent is disengaged from the slot in the cage side portion to prevent the cap from securing to the fastener. The body can include an opening for receipt of a gauge for contacting the interior region of the uppermost washer and for determining a height difference between the outer periphery of the uppermost washer and the interior region of the fastener.

16 Claims, 2 Drawing Sheets

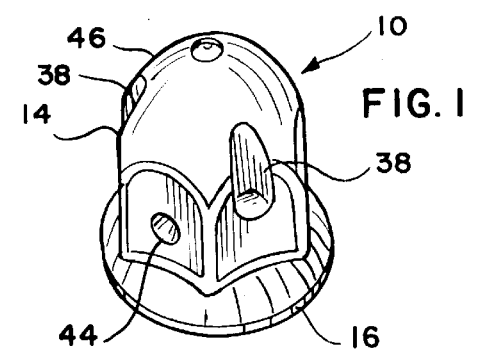
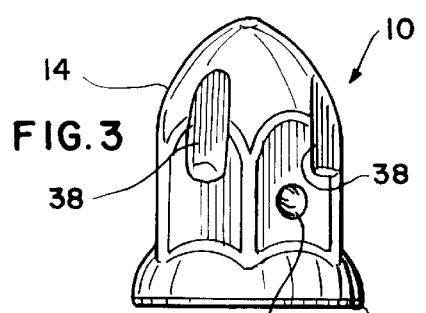
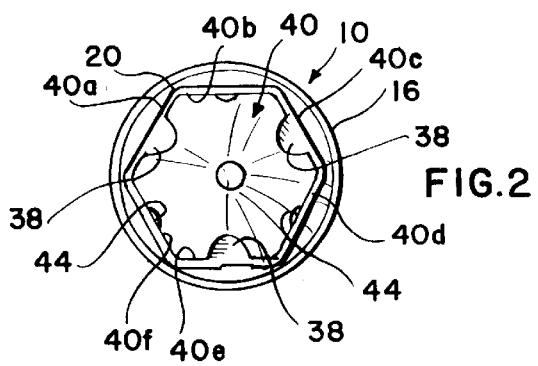
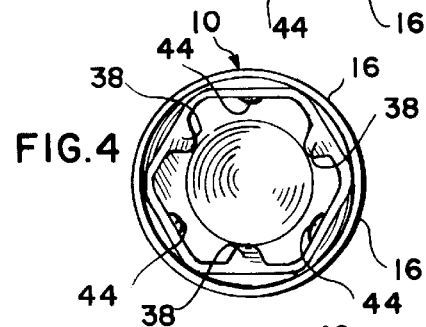
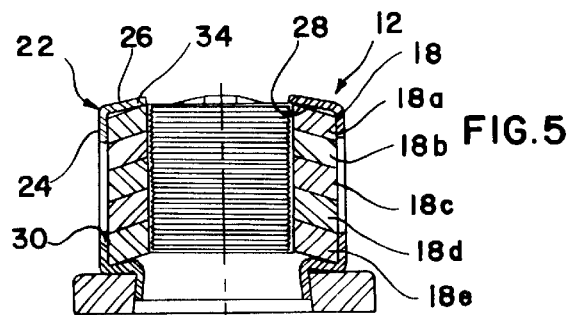
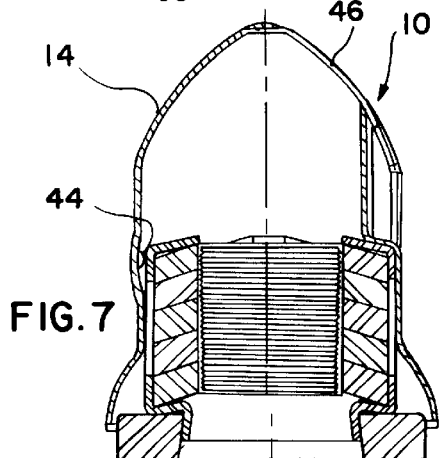
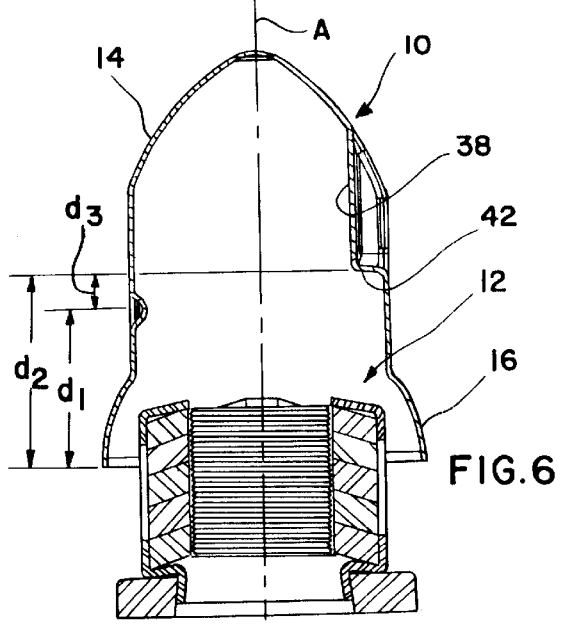
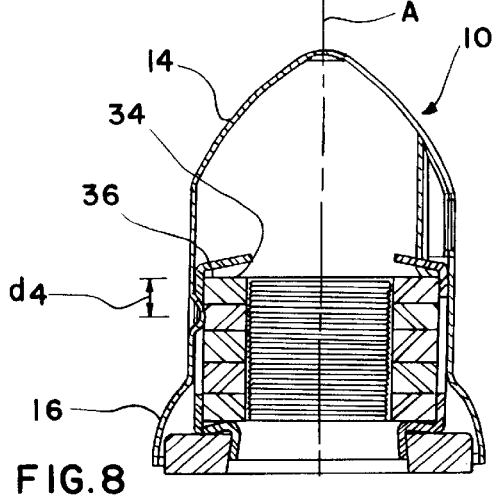

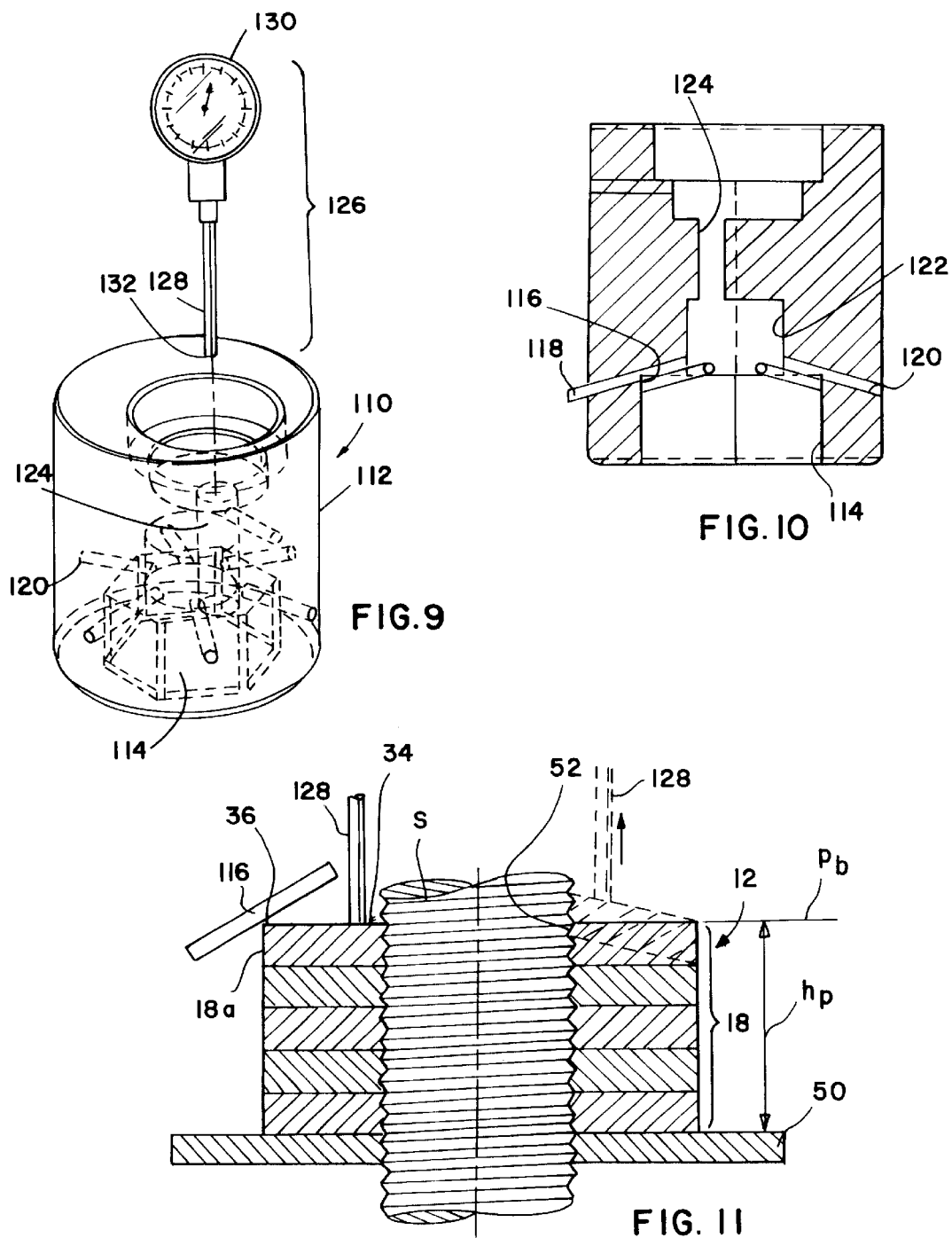

UTILITY LUG NUT TENSION INDICATOR

FIELD OF THE INVENTION

The present invention pertains to tension loss indicators for a wheel lug nut. More particularly, the present invention pertains to devices for indicating a loss of torque in a lug nut, such as that used for mounting wheels for trucks and utility vehicles.

BACKGROUND OF THE INVENTION

One type of lug nut is a PACNUT® (PACNUT® is a registered trademark of Illinois Tool Works of Glenview, Ill.). The PACNUT® includes a stack of conical washers assembled on a base washer. The conical and base washers are held in place by a cage and are internally threaded to secure to, for example, a threaded bolt shank. When the PACNUT® is placed in tension, the conical washers are flattened to produce a locking action that results in tension or stretch in the joint. Exemplary of a PACNUT® type of fastener is that fastener disclosed in Mitts, U.S. Pat. No. 6,015,253 and Reynolds, U.S. Pat. No. 4,900,209.

These fasteners are used in wheel lug nut applications, typically for trucks and other large utility vehicles. Use of these fasteners facilitates proper tensioning of the wheel to hub joint. Such applications, however, present several critical challenges. For example, it is critical that tension on a stud secured with this type of fastener is carefully monitored for safety reasons. Proper torque on the fastener or tension in the joint provides one indication of safe operating conditions.

One known method for measuring the tension on the stud is to measure the torque applied to the fastener such as with a torque wrench. This, however, is a labor intensive undertaking and requires specialized, calibrated tools for measuring the torque. This is particularly the case for large semi-tractor trailers and the like which may include as many as ten fasteners per wheel and more than sixteen wheels for tandem truck arrangements.

Also known are caps that include indicating arrows to indicate that the nut has not moved. Such an indicating cap is disclosed in Patti, U.S. Pat. No. 5,120,174. In such a cap, indicia, such as arrows, are oriented in a particular direction (e.g., aligned with one another) to indicate that the nut has not moved and therefore that tension in the joint is acceptable. A change in the arrow orientation generally indicates that the tension has changed and that a failure may have occurred. However, indicating caps require close visual inspection in order to make a determination of whether the arrow orientation has changed from a predetermined setting. In addition, it is possible that the tension in the joint can decrease to an unacceptable or unsafe level without the nut moving.

Accordingly, there exists a need for a utility hub lug nut tension or torque loss indicating device that provides ready indication of a change in tension in the joint (or tension on the fastener). Desirably, such a device is self-indicating, and is used without requiring the application of torque to the fastener. Most desirably, such a device is inserted or positioned over the fastener to provide such tension-loss indication quickly and accurately.

SUMMARY OF THE INVENTION

A tension loss indicator for use with a fastener provides readily discernible visual indication of improper tension in the joint or loss of tension in the joint. The fastener is formed from a stack of conical washers confined in the stack by a cage. The stack defines an uppermost washer having an upper surface and further defines an interior region intermediate an edge thereof and a longitudinal axis of the stack. The cage includes longitudinally extending side portions having a slot formed therein.

In one embodiment, the indicator is configured as a cap that cooperates with and is positioned over the fastener. The cap includes a body configured for receipt over the fastener conical washers. The body defines an interior surface. A base flange is contiguous with the body.

At least one stanchion, and preferably a plurality of stanchions extend inwardly of the cap from the interior surface. Each stanchion defines an end longitudinally spaced from the base flange. The cap further includes at least one, detent and preferably a plurality of detents, each extending inwardly of the cap from the interior surface. The detents are longitudinally spaced from the base flange. The detents can be circumferentially spaced from the stanchions.

When the stack of conical washers is placed under tension with the uppermost washer in a planar condition, the stanchions lie adjacent the uppermost washer at the interior region and the detents engage and secures into the slots in the cage side. This secures the cap to the fastener. Conversely, when the stack of conical washers is under a tension that is insufficient to urge the uppermost washer into the planar condition, the stanchions abut the uppermost washer at the interior region and the detents are disengaged from the slots in the cage. This prevents the cap from securing to the fastener cage and/or dislodges the cap from the fastener.

In a current embodiment, the interior surface of the cap body defines a hexagonal cross-sectional shape, defining six contiguous side surfaces. In this hexagonal arrangement, the cap preferably includes three stanchions extending inwardly of the cap from alternating ones of the six contiguous sides, and three detents extending inwardly of cap from alternating others of the six contiguous sides. The cap body is preferably enclosed. The base flange can extend radially outwardly of the body.

An alternate embodiment of the tension loss indicator includes a body defining a central nut bore that is configured to snuggly receiving the fastener. A through body eccentric bore is contiguous with and opens into the nut bore.

At least one, and preferably a plurality of stops are disposed within the central nut bore. The stops define a baseline plane relative to an outermost periphery of the uppermost washer when the fastener is positioned within the nut bore, in contact with the stops.

The indicator includes indicating means, such as a mechanical displacement gauge that is positioned within the eccentric bore for determining a height of the uppermost washer at a location intermediate the outer periphery of the uppermost washer and the longitudinal axis of the stack. The height of uppermost washer (flexed or unflexed) is determined relative to the baseline plane at the outer periphery of the uppermost washer.

In a preferred embodiment, the gauge includes a stem portion having a tip, and the eccentric bore is positioned such that the stem tip contacts the fastener immediately adjacent a central stud-receiving opening. In a most preferred embodiment, the fastener stops are formed integral with the body.

These and other features and advantages of the present invention will be apparent from the following detailed description, in conjunction with the appended claims.

BRIEF DESCRIPTION OF THE FIGURES

FIG. 1 is a top perspective view of a tension loss indicator for a PACNUT® type fastener, the indicator embodied in a cap for the fastener, in accordance with e principles of the present invention;

FIG. 2 is a top plan sectional view of the cap of FIG. 1, illustrating the stanchions and detents form in the cap wall;

FIG. 3 is a cross-sectional view of the cap taken along line 3—3 of FIG. 2;

FIG. 4 is a cross-sectional view of the cap similar to FIG. 2 shown with a portion of the fastener in the cap;

FIG. 5 is a cross-sectional view of an exemplary PACNUT® type fastener;

FIG. 6 illustrates the exemplary cap being positioned on the fastener of FIG. 5, which fastener is not properly tensioned for use;

FIG. 7 further illustrates the fastener of FIGS. 5 and 6 with the cap urged from engagement with the fastener;

FIG. 8 illustrates the cap fully engaged with a properly tensioned fastener;

FIG. 9 is a perspective view of an alternate embodiment of the indicator embodying the principles of the present invention, this embodiment including indicating means, such as the exemplary mechanical indicator gauge for measuring the amount of flex of the fastener washers, which correlates to tension;

FIG. 10 is a cross-sectional view of the body of the indicator of FIG. 9; and

FIG. 11 is an illustration of the contact of the mechanical indicator gauge of the FIG. 9 embodiment with the washers of the fastener.

DETAILED DESCRIPTION OF THE PREFERRED EMBODIMENTS

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

Referring now to the figures and in particular to FIG. 1 there is shown an embodiment of a utility lug nut tension indicator 10 embodying the principles of the present invention. The indicator 10 is configured as a cap for receipt over a fastener, such as a PACNUT® brand fastener 12, as illustrated in FIGS. 5–8.

The cap 10 includes a main body portion 14 and a base flange 16. The main body portion 14 can take any shape that is complementary to the fastener 12 on which it is used. In a typical use, the fastener 12 will include a plurality or stack of conical, hexagonal washers 18a–e (referred to collectively as the stack 18) and the body 14 of the cap 10 will have a complementary hexagonal inner cross-sectional shape as indicated at 20 in FIG. 2. As will be recognized by those skilled in the art, although the hexagonal shape is typical and widely accepted in the industry, the fastener 12 can take many shapes and as such, the inner cross-sectional shape 20 of the cap 10 can likewise take many shapes. All such shapes are within the scope and spirit of the present invention.

In a typical fastener 12 such as that illustrated in FIG. 5 and the aforementioned patent to Mitts, which is incorporated herein by reference, the conical washers 18a–e are secured relative to one another by a cage 22. The cage 22 is configured having substantially planar side portions 24 that extend longitudinally along the stack of washers 18 and a top portion 26 of the cage 22 that extends from the side portions 24 over a portion of the top surface 28 of the top washer 18a. Such a cage 22 includes openings or slots 30 extending longitudinally along the side portions 24. The cage 22 can also include open areas at about one or more of the side/top comer junctures 32 to expose at least a portion (indicated at 34) of the top washer 18a inward of an outer periphery 36 of the washer 18a, and between the outer periphery 36 and a longitudinal axis A of the stack 18. The "exposed" or open interior region 34 of the washer 18a coincides with at least a portion of the washer stack 18 that flexes or flattens as it is tensioned onto the bolt shank (not shown). For purposes of the discussion herein, reference to fastener shall be to the above-described conical washer type fastener, such as the exemplary PACNUT® brand fastener.

The present cap 10 includes at least one, and preferably a plurality of stanchions 38 extending inwardly from an inner surface 40 of the cap 10. Referring to the cap illustrated in FIG. 4, in which the cap 10 is formed having a hexagonal inner cross-sectional shape 20 defining a contiguous six-sided inner surface 40a–f, stanchions 38 extend inwardly from three alternating surfaces 40a,c,e. The stanchions 38 are configured so that they extend longitudinally along a portion of the surfaces 40a,c,e and do not extend into the body of the washer stack 18 when the cap 10 is positioned over the fastener 12. That is, the stanchions 38 each define an end 42 that is spaced from the base flange 16.

Also on an interior surface 40, the cap 10 includes at least one and preferably a plurality of inwardly extending detents 44. In a current embodiment, the cap 10 includes three detents 44 that are disposed on surfaces 40b,d,f, which are those interior surface between or other than those occupied by a stanchion 38, (e.g., surfaces adjacent to stanchion-containing surfaces). The detents 44 are formed along the walls 40b,d,f, also spaced from the base flange 16. As will be described in more detail below, the distance $d_1$ between the base flange 16 and the detent 44 is dependent upon the distance $d_2$ between the base flange 16 and the stanchion end 42, and the position or length $l_s$ of the slot 30, as well as its position relative to the height h of the washer stack 18.

In a preferred embodiment, the cap 10 is configured having a closed top 46 to prevent debris such as, dirt, road salt and the like, as well as grease and oil from contacting the fastener 12. In a current embodiment, the cap 10 is formed from a plastic material and is coated, such as by painting, with a chrome or like finish. Such a finish improves the aesthetics of the cap 10 and is intended to be more visually appealing than the fastener 12 itself or an unfinished cap.

Referring now to FIGS. 6 through 8, the cooperation of a cap 10 of the present invention with a typical fastener 12 will be described. FIG. 6 illustrates a fastener 12, not under tension with a cap 10 positioned partially thereover. As can be seen from this figure, the fastener laminations or washers 18a–e are angled upwardly at the interior threaded region 34. As will be recognized and understood by those skilled in the art, as the fastener 12 is tightened down onto the stud, the laminations or washers 18a–e flatten, and become substantially planar.

Referring now to FIG. 7, there is shown a cap 10 that is engaged with the fastener 12 of FIG. 6, which fastener 12 has not been properly torqued down onto the stud. The stanchion end 42 contacts the interior region 34 of the top washer 18a inwardly of the washer outer periphery 36. The contact between the stanchion end 42 and washer 18a prevents the cap 10 from being fully engaged with the fastener 12. In this manner, the cap 10 sits loosely on the fastener 12 and can be readily removed therefrom. As will also be appreciated from the figures, the detent 44 does not fully engage the slot 30 in the cage side 24. This configuration prevents the cap 10 from being "snapped" onto the fastener 12.

Referring now to FIG. 8, a fully torqued fastener 12 is shown in which the washers 18a–e flatten as a result of proper tension in the joint. In this arrangement, the interior region 34 of the washers 18a–e flatten (i.e., become substantially planar) and thus, do not interfere with downward movement of the stanchion 38 (and thus the cap 10). Thus, the top surface 28 of the top washer 18a of the fastener 12 is positioned to permit fastening the cap 10 to the fastener 12. With the cap 10 fully engaged with the fastener 12, the detent 44 is positioned within the longitudinal slot 30 running along the cage side 24. Thus, in the condition shown in FIG. 8, where the fastener 12 is properly tensioned on the wheel spindle stud, the cap 10 can fully engage or "snap" onto the fastener 12.

As will be appreciated by those skilled in the art, the stanchion ends 42 are formed at a predetermined longitudinal distance $d_3$ from the detents 44 that is about equal to the longitudinal distance $d_4$ between the end of the cage slot 30 and the top of the fastener 12 when it is properly tensioned on the bolt. Thus, if the fastener 12 is not properly tensioned on the bolt, or if the fastener 12 loses tension, the washers 18a–e will flex upwardly at the interior region 34 and the longitudinal distance between the interior region 34 and the upper edge of the cage slot 30 will increase.

As may occur during operation of the vehicle, it is not unknown for the joint to lose tension due to wearing away of paint or other materials, thus causing the fastener 12 to lose tension in the joint. When this occurs, the fastener 12 will shift from the condition as shown in FIG. 8 to that shown in FIG. 7. As the washers 18a–e of the fastener 12 begin to flex upwardly at the interior region 34, the upper surface 28 of the uppermost washer 18a contacts the bottom end 42 of the stanchion 38. This results in a force exerted on the stanchion 38 sufficient to dislodge the detent 44 from the slot 30 in the cage side 24. When this occurs, the cap 10 dislodges from the fastener 12, thus providing visual indication of a loss of tension in the joint. Thus, if a cap 10 is loose to the touch or missing from the fastener 12 (or from over the fastener 12) readily discernable visual indication is provided that the wheel hub tension may be lost or reduced.

The present description and drawings have been provided assuming a hexagonal fastener 12 and a hexagonal internal cross-sectional shape 20 of the present cap 10. As will be recognized by those skilled in the art, although the exemplary hexagonal shape is widely accepted in the industry, a variety of shapes can be used for the fastener 12 and the internal cross-sectional shape 20 of the cap 10 as well. All such shapes are within the spirit and scope of the present invention.

Likewise, the present discussion has also provided that stanchions 38 and detents 44 are formed extending inwardly from the inner surface 40 of the cap 10 alternatingly from one another and symmetrically disposed about the cap 10. However, as will be recognized by those skilled in the art, the stanchions 38 and detents 44 need not be alternatingly configured nor do the stanchions 38 and/or detents 44 need be symmetrical relative to other stanchions 38 and/or detents 44 that are formed in the cap 10.

An alternate embodiment of the indicator 110 is shown in FIGS. 9 through 11. As discussed above, when the fastener 12 is properly tensioned, the washers 18 are planar (i.e., not upwardly flexed), and conversely, when the fastener is not properly tensioned the washers 18 are not planar and flex upwardly. For illustration purposes, the left-hand side of the fastener in FIG. 11 shows the fastener 12 fully loaded or tensioned, and the right-hand side of the fastener shows, in phantom lines, the uppermost washer 18a in a less than fully tensioned state, in which the washer 18a is flexed upwardly.

The indicator 110 includes a body 112 defining a central or nut bore 114 for receiving the fastener 12. Preferably, the nut bore 114 is configured having a shape that is complementary to that of the fastener 12 for snug fit of the fastener 12 in the bore 114, and so that the fastener 12 does not rotate relative to the indicator body 112. The body 112 includes one or more stops 116 that are positioned to accurately longitudinally position the fastener 12 within the body 112. The stops 116 contact the uppermost washer 18a at an outermost periphery 36 to define a first plane $P_b$ relative to that periphery 36. Because the height $h_p$ of the outermost periphery 36 of the uppermost washer 18a remains constant relative to the base 50 of the fastener 12, regardless of whether the fastener 12 is in tension or not, this height defines a baseline against which the flex of the washers 18 is measured. In this manner, as seen in FIG. 11, regardless of whether the washers 18 are planar or flexed, the stops 116 define a baseline plane at the outer periphery 36 of the uppermost washer 18a to measure the flex of the washers 18 at the interior region 34 of the.

In a current embodiment, the stops 116 are provided by pins 118 that are inserted into pin bores 120 formed in the body 112. The pins 118 are inserted into the pin bores 120 and extend into the central nut bore 114. Thus, when the fastener 12 is positioned in the indicator body 112, the uppermost washer 18a contacts the pins 118 to "stop" or longitudinally position the fastener 12 in the bore 114. It is anticipated that the stops 116 can be formed in any of a variety of manners, and may be formed integral with the indicator body 112, as, for example, part of the casting process of the body 112. These methods for forming the stops will be recognized and appreciated by those skilled in the art and are within the scope and spirit of the present invention.

The body 112 further includes a stud bore 122 or like opening contiguous with the nut bore 114 that is configured for receipt of the stud S as it extends upwardly from the fastener 12. A third opening or gauge bore 124 is formed in the body 112 which opening 124 is eccentrically positioned or off-center relative to the nut bore 114. The gauge bore 124 extends completely through the body 112 and opens into the nut bore 114.

A depth or displacement gauge 126 is positioned within the gauge bore 124 extending through the indicator body 112 into the nut bore 114. The gauge 126 is of the type that includes a reciprocating plunger or stem 128. As the stem 128 reciprocates (i.e., moves up and down), the movement or displacement of the stem 128 is indicated on an indicator 130, such as the exemplary gauge dial. Those skilled in the art will recognize that other types of gauges can be readily used in lieu of the dial gauge, which other types of gauges are within the scope of the present invention.

The gauge 126 is fixedly positioned within the body 112 so that it measures from the baseline plane $P_b$. As positioned in the gauge bore 124, the tip or touch portion 132 of the gauge 126 contacts the uppermost washer 18a immediately adjacent to the central opening 52 in the washer 18a (the opening 52 through which the stud S inserts), within the internal region 34 of the washer 18a.

As can be seen by comparing the left and right hand sides of the fastener 12 in FIG. 11, the displacement gauge 126 measures the amount of flex of the uppermost washer 18a in that as the washers 18 flex, the uppermost washer 18a contacts the gauge tip 132, moving the gauge stem 128 upwardly, and thus the gauge dial 130 accordingly. In use, the indicator 110 is set or calibrated by positioning the gauge 126 in the gauge bore 124 such that the gauge tip 132 rests on the uppermost washer 18a when the fastener 12 is properly tensioned. The gauge 126 is then secured in place. This displacement of the stem 132 can be set or calibrated to a "zero" or tensioned value. When the fastener 12 loses tension (as seen on the right-hand side of FIG. 11 in phantom), the stem 128 moves or is urged upwardly, which in turn is shown on the gauge dial 130.

In that the tension on the fastener can be determined empirically, the gauge 126 can be calibrated so that even if the washers 18 begin to flex, but the fastener 12 is still within an acceptable tension or torque value, the gauge dial 130 can show that there is still adequate tension in the joint.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A tension indicator for use with an associated fastener, the associated fastener formed from a stack of conical washers confined in the stack by a cage, the stack defining an uppermost washer having an upper surface and further defining an interior region intermediate an edge thereof and a longitudinal axis of the stack, the cage including longitudinally extending side portions having a slot formed therein and including a top securing member extending from the side portions to maintain the washers in the stack, the tension indicator comprising:

a body defining a cap and configured for receipt over the stack of conical washers, the body defining an interior surface;

a base flange contiguous with the body;

at least one stanchion extending inwardly of the cap from the interior surface, the stanchion defining an end longitudinally spaced from the base flange; and at least one detent extending inwardly of the cap from the interior surface, longitudinally spaced from the base flange, the detent positioned between a longitudinal extent of the base flange and the stanchion end, wherein when the tension indicator is positioned over the associated fastener with the stack of conical washers placed under tension with the uppermost washer in a planar condition, the stanchion lies adjacent the uppermost washer at the interior region and the detent engages and secures into the slot in the cage side portion to secure the cap to the fastener, and wherein when the stack of conical washers of the fastener is under a tension insufficient to urge the uppermost washer into the-planar condition, the at least one stanchion abuts the uppermost washer at the interior region and the detent is disengaged from the slot in the cage side portion to prevent the cap from securing to the fastener.

2. The tension indicator in accordance with claim 1 wherein the at least one detent is circumferentially spaced from the at least one stanchion.

3. The tension indicator in accordance with claim 1 wherein the interior surface of the cap body defines a hexagonal cross-sectional shape, defining six contiguous side surfaces.

4. The tension indicator in accordance with claim 1 wherein the body is enclosed.

5. The tension indicator in accordance with claim 1 wherein the base flange extends radially outwardly of the body.

6. The tension indicator in accordance with claim 1 including a plurality of stanchions symmetrically disposed about the cap extending inwardly from the interior surface of the cap.

7. The tension indicator in accordance with claim 1 including a plurality of detents symmetrically disposed about the cap extending inwardly from the interior surface of the cap.

8. A tension indicator for use with an associated fastener, the associated fastener formed from a stack of conical washers confined in the stack by a cage, the stack defining an uppermost washer having an upper surface and further defining an interior region intermediate an edge thereof and a longitudinal axis of the stack, the cage including longitudinally extending side portions having a slot formed therein and including a top securing member extending from the side portions to maintain the washers in the stack, the tension indicator comprising:

a body defining a cap having a hexagonal cross-sectional shape defining six contiguous side surfaces and configured for receipt over the stack of conical washers, the body defining an interior surface;

a base flange contiguous with the body;

three stanchions extending inwardly of the cap from alternating ones of the six contiguous sides, the stanchions each defining an end longitudinally spaced from the base flange; and three detents extending inwardly of the cap from alternating others of the six contiguous sides, longitudinally spaced from the base flange, wherein when the tension indicator is positioned over the associated fastener with the stack of conical washers placed under tension with the uppermost washer in a planar condition, the stanchions are adjacent the uppermost washer at the interior region and the detents engage and secure into the slot in the cage side portion to secure the cap to the fastener, and wherein when the stack of conical washers of the fastener is under a tension insufficient to urge the uppermost washer into the planar condition, the stanchions abut the uppermost washer at the interior region and the detents are disengaged from the slot in the cage side portion to prevent the cap from securing to the fastener.

9. In combination, a fastener and an indicating cap for indicating loss of tension in the fastener, comprising:

a fastener formed from a stack of conical washers and a cage for maintaining the washers in the stack, the cage having longitudinally extending side portions having a slot formed therein and a top securing member contiguous with the side portions for engaging an uppermost washer at about a peripheral region thereof, the stack of washers having a tensioned state wherein the washers are in a substantially planar condition and an untensioned state wherein the washers are in a substantially non-planar condition, the uppermost washer defining an interior region spaced from the peripheral region; and a cap having a body configured for receipt over the stack of conical washers, the body defining an interior surface, the cap further including a base flange contiguous with the body, the cap formed having at least one stanchion extending inwardly of the cap from the interior surface, the stanchion defining an end longitudinally spaced from the base flange, the cap further formed with at least one detent extending inwardly of the cap from the interior surface, longitudinally spaced from the base flange, wherein when the stack of conical washers is in the tensioned state, the stanchion lies adjacent the uppermost washer at the interior region and the detent engages and secures into the slot in the cage side portion to secure the cap to the fastener, and wherein when the stack of conical washers is in the untensioned state, the stanchion abuts the uppermost washer at the interior region and the detent is disengaged from the slot in the cage side portion to prevent the cap from securing to the fastener.

10. The fastener and cap in accordance with claim 9 wherein the at least one detent is circumferentially spaced from the at least one stanchion.

11. The fastener and cap in accordance with claim 9 wherein the fastener has a hexagonal shape and the interior surface of the cap body defines a hexagonal cross-sectional shape, defining six contiguous side surfaces.

12. The fastener and cap in accordance with claim 11 wherein the cap includes three stanchions extending inwardly of the body from alternating ones of the six contiguous sides, and wherein the cap includes three detents extending inwardly of the body from alternating others of the six contiguous sides.

13. The fastener and cap in accordance with claim 9 wherein the cap body is enclosed.

14. The fastener and cap in accordance with claim 9 wherein the cap base flange extends radially outwardly of the body fully covering the fastener.

15. The fastener and cap in accordance with claim 9 wherein the cap includes a plurality of stanchions symmetrically disposed about the cap extending inwardly from the interior surface of the cap.

16. The fastener and cap in accordance with claim 9 wherein the cap includes a plurality of detents symmetrically disposed about the cap extending inwardly from the interior surface of the cap.

* * * * *